Figure 1:
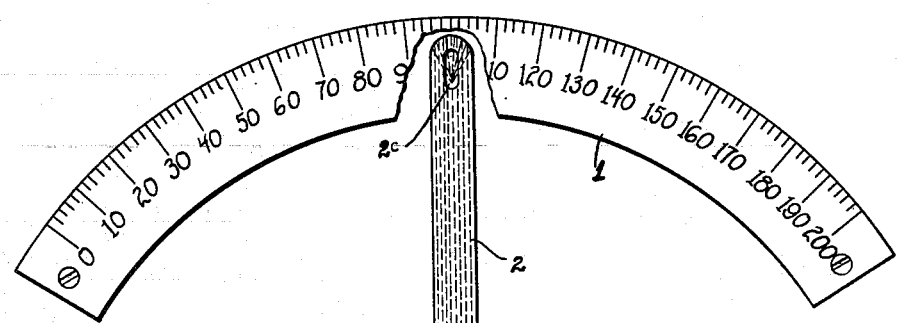
Figure 1:
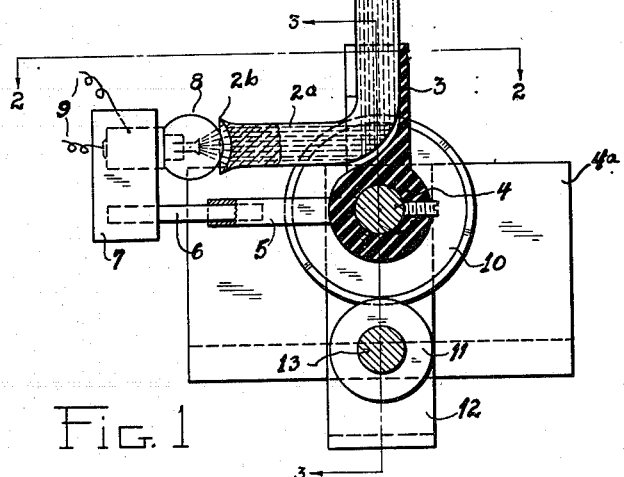

Feb. 16, 1937.   L. A. HYLAND   2,071,284
INDICATING DEVICE
Filed Oct. 23, 1935   4 Sheets-Sheet 1

Inventor
Lawrence A. Hyland

Feb. 16, 1937.  L. A. HYLAND  2,071,284
INDICATING DEVICE
Filed Oct. 23, 1935  4 Sheets-Sheet 3

INVENTOR
Lawrence A. Hyland
by Benj. Chromy
atty.

Feb. 16, 1937.    L. A. HYLAND    2,071,284
INDICATING DEVICE
Filed Oct. 23, 1935    4 Sheets-Sheet 4

Inventor
Lawrence A. Hyland
By Ben J. Chromy
Attorney

Patented Feb. 16, 1937

2,071,284

UNITED STATES PATENT OFFICE 2,071,284

INDICATING DEVICE

Lawrence A. Hyland, Washington, D. C., assignor, by mesne assignments, to Bendix Radio Corporation, New York, N. Y., a corporation of Delaware Application October 23, 1935, Serial No. 46,413

7 Claims. (Cl. 116—124.1)

This invention relates to indicators in general. More particularly this invention relates to indicators wherein a spot of light is caused to move over a graduated scale for indicating the relative position of a movable element or elements with respect to a stationary member or members.

An object of this invention is to provide a rotatable member adapted to rotate through a certain angle simultaneously as a movable element is shifted in position over a predetermined course and a point on the rotatable member describes a locus over a graduated scale, the rotatable member functioning to illuminate small portions of the graduated scale with light transmitted from a light source positioned near the axis of rotation of the rotatable member.

Another object of this invention is to provide an indicator element adapted to be moved angularly through a predetermined angle over a graduated scale and simultaneously illuminate the scale by light transmitted from a source located near the axis of the indicator element.

Still another object is to provide an indicator element in which a movable member is shifted over a scale and its movement with respect to the scale is indicated by an illuminated line coinciding with the graduations of the scale traversed by the movable member.

Still another object of this invention is to provide an indicator employing a scale, which may be stationary or rotatable, a quartz rod, having one end thereof attached to a rotatable shaft and the other end thereof movable over said scale and light source positioned to transmit light through said quartz rod to said scale as said rod is moved over said scale.

Another object of this invention is to provide a quartz rod having an end thereof movable over a scale and a light source adapted to be energized in accordance with signalling energy, said light source being positioned at one end of said quartz rod or adjacent thereto for the purpose of transmitting light through said rod to said scale when said lamp is energized.

Other and further objects of this invention will be apparent to those skilled in the art to which it pertains from the following specification and the appended claims.

In accordance with this invention a small lamp is placed near the axis of rotation of an indicating pointer such as is commonly employed in radio sets. This lamp is positioned to transmit light rays through a quartz rod or a silvered glass rod, which is associated with a movable shaft, to a scale which is mounted for view by the operator. As the shaft is rotated the light transmitted through the rod illuminates a small section of the scale and the operator is thus apprised of the relative position of the rotatable shaft. It is preferred that the rod transmitting the light to the scale be out of view of the operator and that only the line of travel of the light over the scale be visible.

Figure 2:
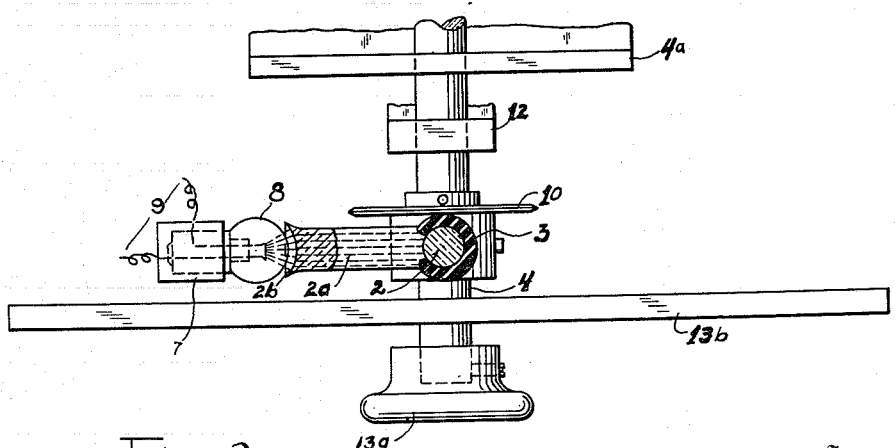
Figure 3:
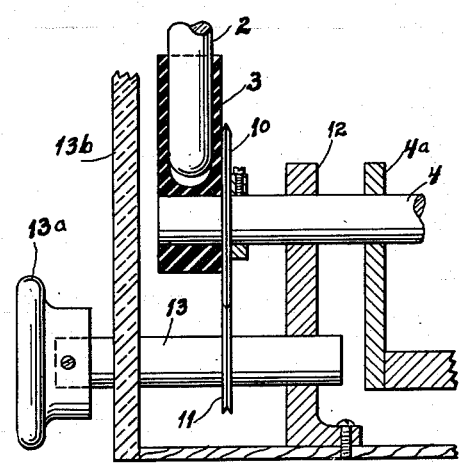
Figure 4:
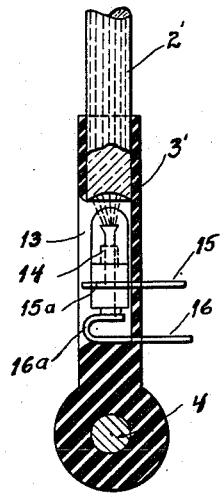
Figure 5:
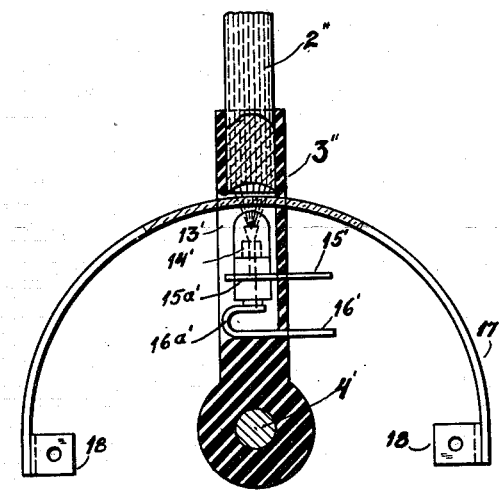
Figure 6:
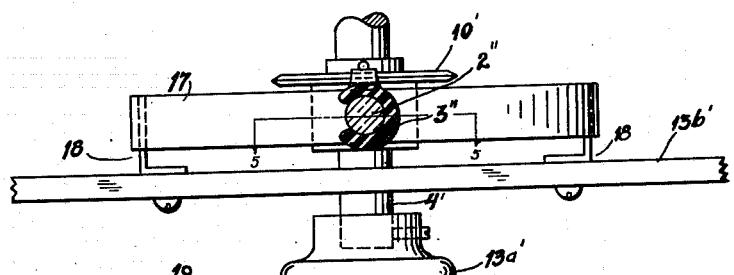
Figure 7:
Figure 8:
Figure 9:
Figure 10:
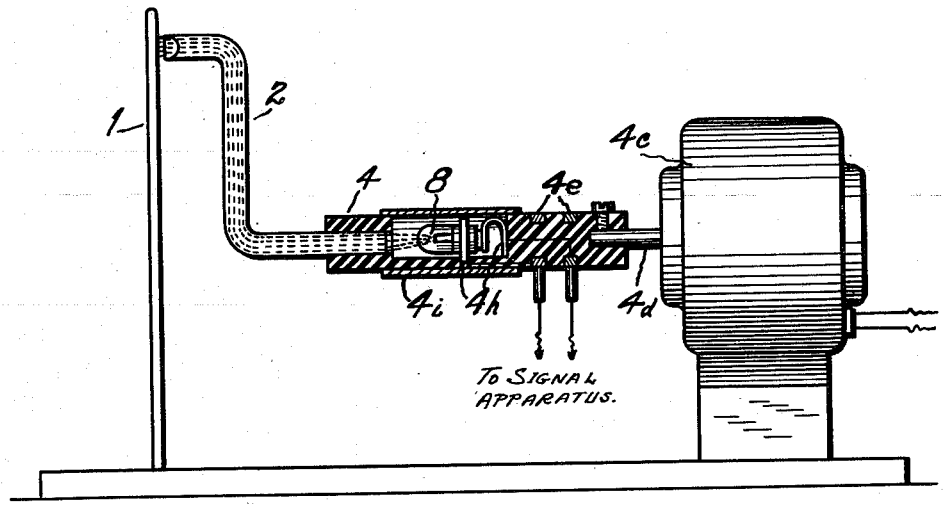
Figure 10A:
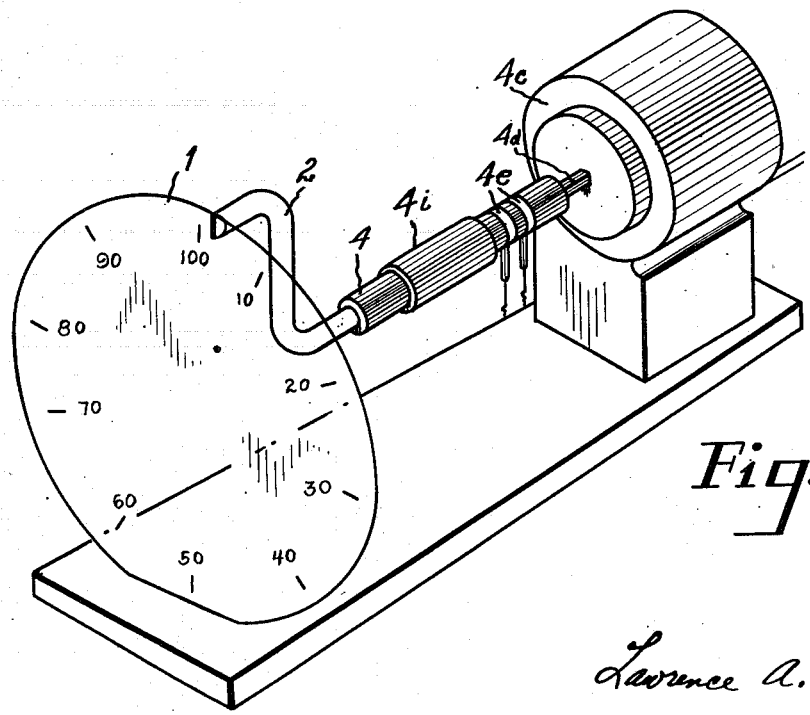

This invention will be more clearly understood from the following specification when read together with the accompanying drawings in which Fig. 1 is a plan view in fragmentary cross-section; Fig. 2 is a horizontal sectional view; Fig. 3 is a side elevational view taken along the line 3—3 of Fig. 1; Fig. 4 is a fragmentary sectional view of a modified form of this invention; Fig. 5 is a fragmentary sectional view of still another form of this invention; Fig. 6 illustrates a horizontal sectional view of the form of this invention illustrated in vertical elevation in Fig. 5; Fig. 7 is a detail view of a modified form of light transmitting pointer; Fig. 8 illustrates a detail of a light decomposing member employed in this invention; Fig. 9 is a sectional view taken along the line 9—9 of Fig. 7, and Figs. 10 and 10a illustrate another embodiment of this invention wherein the shaft carrying the quartz rod is rotatable by means of a motor.

Referring to Fig. 1 of the drawings in detail, reference numeral 1 designates a scale graduated to be used in conjunction with the indicator element 2. This scale may be of the type used with a variable condenser of a radio set or other variable tuning element, to indicate the relative positions of the tuning elements or parts of these elements, or it may be of a type adapted for use with other devices particularly where it is desired to produce an illuminated indication on the scale.

This scale may be graduated in kilo-cycles to indicate frequency or in meters to indicate wavelength if desired. The shaft 4 of the variable tuning unit (Figs. 2 and 3) has mounted thereon the member 3, which supports the light transmitting rod 2. This rod 2 is preferably of quartz, however, silvered glass may be used if desired. A rod 5, having a section 6 adapted to slide into it, is attached to the member 4 for the purpose of supporting the socket block 7. Lamp 8 is supported by the block 7 adjacent to the end 2b of the section 2a of the light rod. Flexible connections 9 are provided to the block 7 for connecting a source of current supply to the lamp 8. Lamp 8 is removable from the block for purposes of replacement and in order to perform this operation the rod 6 is withdrawn from the member 5 until the lamp is free of the rod 2. The lamp may be coated with opaque or semi-opaque material on its surface except a section adjacent to the section 2b of the light rod to prevent light from being transmitted in direction other than to the rod 2.

A disc 10 is mounted on the shaft 4 for frictional engagement with the disc 11 of shaft 13. A bearing 12 is provided for the shafts 4 and 13 and a knob 13a is employed to turn the shaft 13. This knob 13a may be operated manually or replaced by other means for more or less remote control of the shafts.

Variable tuning element 4a is arranged to be controlled by the shafts 4 and 13. Panel 13b (Fig. 2) is illustrated to show the relative positions of the various mechanisms with respect to the front of the radio set panel.

In operation the knob 13a is rotated to adjust the tuning unit 4a; simultaneously the rod 2, which is mounted on the shaft 4, is moved through an angle equal or proportional to the angle of adjustment or distance of movement of the tuning unit. As the rod 2 is moved over the scale 1, light transmitted from the lamp 8 is emitted from a small narrow slit 2c formed on a surface of the rod directly back of the semi-transparent scale strip 1. The end of the rod 2 near the slit 2c is prepared to prevent the light rays transmitted by the rod from leaving the rod so that these rays are caused to leave the rod through the slit. This may be accomplished by grinding or roughening the end of the rod to give it the appearance of a ground glass surface or by coating the rod surface with such materials as silver or lamp black paint. The surface of the slit is not roughened or coated.

A modified form of this invention illustrated in Fig. 4 of the drawings is shown to illustrate that the lamp, used to transmit light rays to illuminate the indications on the scale, may be positioned directly in the member supporting the light rod on the tuning unit shaft.

In Fig. 4 the light rod 2', corresponding to the rod 2 of Fig. 1, is supported in the tubular end of the member 3' adjacent to the lamp 14. The member 3' may be made of phenol condensation products or similar readily molded materials having relatively good heat resisting qualities. Resilient wire members 15 and 16 are molded into the member 3' to protrude into the lamp receiving recessed section 13 of the member 3'. The lamp 14 is gripped by the sections 15a and 16a of the resilient wire members and held in place. These members also serve as contacts and electric current conductors to the lamp.

Fig. 5 of the drawings illustrates a form of this invention in which a colored strip 17 of glass, celluloid or cellulose acetate material is interposed between the lamp 14' and the light rod 2''. This strip is supported by the brackets 18 upon the panel 13b' to retain its shape, as illustrated in Fig. 6 of the drawings.

The purpose of the strip 17 is to produce different color effects as the indicator light rod 2'' is moved over the graduated scale. This is accomplished by coloring different sections of the strip 17 with different colors pleasing to the eye. As the shaft 4' is rotated the lamp which is supported by resilient wires 15a' and 16a' in the recess 13' of member 3'', causes light to be transmitted to the rod 2'' through different sections of the strip. The strip 17 is maintained stationary with respect to the lamp and the light rod. This colored strip may be replaced by a prismatically corrugated strip 17a illustrated in Fig. 8, or by a similar strip adapted to decompose light into light of the primary colors.

The rod 2'' (Figs. 5 and 6) and 2' (Fig. 4) may be replaced by a tubular member 20 illustrated in Figs. 7 and 9. The tubular member 20 is preferably a continuation of the member 3' (Fig. 4). A small angularly shaped member 19 of quartz or silvered glass is fitted into the end of the tube 20 to guide the light transmitted through the tube by a lamp to a small slit formed in the member 19. This small slit transmits the light rays to the scale corresponding to scale 1 of Fig. 1.

Figs. 10 and 10a illustrate a form of this invention wherein the quartz rod 2 is mounted in the lamp housing 4 and shaft 4d of motor 4c for the purpose of rotating the rod over a scale 1 of substantially circular shape. The quartz rod 2 receives light from the lamp 8 and transmits it to the scale 1. The lamp 8 in this case may be of the glow discharge type adapted to be energized by signal energies and has a very small time lag in responding to said energies. However, other types of lamps may be used particularly if the response thereof does not lag materially behind the initial energy impulse or impulses impressed thereon. The lamp 8 is housed in a small cavity in the rotatable casing 4 and a slidable, tightly fitted cover 4i is provided over the opening in the casing through which the lamp is inserted into the cavity. Contacts 4h and slip rings 4e are provided to the housing 4 to connect the lamp 8 to the signal receiver, with which the indicator of my invention is employed, to indicate the intensity of the signal or to indicate when the signal is properly tuned in. The signal receiver is connected to the slip rings 4e through suitable brushes.

In cases where the indicator of my invention is employed in devices, such as, sonic depth finders, where it is desired to obtain the time that elapses between two or more signal impulses between two or more signal impulses received and impressed on the lamp 8, the shaft 4 is preferably driven by a motor 4c. In this way, knowing the speed of the motor 4c and observing the distance between the impulses on the scale 1, the time between the impulses may be determined. Where desired, the scale 1 may be given a coating of fluorescent or radioactive material to prolong the duration of the light or visible indication on the scale. This material is energized by the light from the quartz rod and remains light emitting for a short interval after the light impulse, transmitted through the rod disappears.

It will be observed that while I have described this invention in considerable detail, that various modifications may be made without departure from the scope and spirit thereof, that therefore I do not desire to limit it to those exact details except as defined by the appended claims.

What I claim and desire to secure by Letters Patent of the United States is:

1. In indicators for tuning units the combination with a variable tuning unit or units of means for varying said unit or units, a shaft operatively associated with said tuning unit or units, a light source adjacent to said shaft, means for rotating said shaft, a light transmitting member, a light decomposing member interposed between said light source and said light transmitting member, a scale, means for moving one end of said member over said scale and means for continuously transmitting light to said scale from said source through said member to illuminate a small section of said scale as said tuning unit or units are varied.

2. In indicators for tuning units the combination with a variable tuning unit or units of means for varying said unit or units, a shaft operatively associated with said tuning unit or units, a light source adjacent to said shaft, means for rotating said shaft, a light transmitting member, a colored strip adapted to pass light of different colors interposed between said light source and said light transmitting member, a scale, means for moving one end of said member over said scale and means for continuously transmitting colored light to said scale from said source through said member to illuminate a small section of said scale as said tuning unit or units are varied.

3. In indicators for tuning units, the combination of an arcuate scale; a quartz rod for illuminating sections of said scale; a rotatable shaft, means for said shaft for engaging and rotating said quartz rod, a lamp; means for supporting said lamp on said rotatable shaft, in fixed relation to one end of said quartz rod and adjacent thereto, for continuously illuminating sections of said scale as the free end of said rod is passed thereover.

4. In indicators for tuning units the combination of an arcuate scale; a quartz rod for illuminating sections of said scale; a rotatable shaft, means for said shaft for holding said quartz rod extended radially from said shaft and for rotating said quartz rod; a lamp; means for supporting said lamp on said rotatable shaft, in fixed relation to one end of said quartz rod and adjacent thereto, for continuously illuminating sections of said scale as the free end of said rod is passed thereover.

5. In indicators for tuning units the combination of an arcuate scale; a quartz rod for illuminating sections of said scale; a rotatable shaft, a member for attaching said rod to said shaft for supporting and rotating said quartz rod, said member having a hollowed-out cavity; a lamp; means for supporting said lamp in said cavity, in fixed relation to one end of said quartz rod and adjacent thereto, for continuously illuminating sections of said scale as the free end of said rod is passed thereover.

6. In indicators for tuning units and the like, the combination of an arcuate scale being disposed over at least a portion of a circular arc; a quartz rod for illuminating sections of said scale; a rotatable shaft, means attached to said shaft for engaging and rotating said quartz rod as said shaft is rotated; a lamp; means for supporting said lamp on said rotatable shaft, in fixed relation to one end of said quartz rod and adjacent thereto, for continuously illuminating sections of said scale as the free end of said rod is passed thereover.

7. In indicators for tuning units and the like, the combination of an arcuate scale; a quartz rod for illuminating sections of said scale; a rotatable shaft, a sheath-like member for receiving one end of said rod, said member being attached to said shaft for rotating said quartz rod; a lamp; means for supporting said lamp in said member, in fixed relation to one end of said quartz rod and adjacent thereto, for continuously illuminating sections of said scale as the free end of said rod is passed thereover.

LAWRENCE A. HYLAND.